United States Patent [19]

Birochik

[11] Patent Number: 4,593,529
[45] Date of Patent: Jun. 10, 1986

[54] METHOD AND APPARATUS FOR CONTROLLING THE TEMPERATURE AND PRESSURE OF CONFINED SUBSTANCES

[76] Inventor: Valentine L. Birochik, Box 8416, Swissvale, Pa. 15218

[21] Appl. No.: 677,740

[22] Filed: Dec. 3, 1984

[51] Int. Cl.⁴ .................................................. F25B 21/02
[52] U.S. Cl. ........................................ 62/3; 220/85 VS
[58] Field of Search .................................. 62/54, 45, 3; 220/85 VR, 85 X VS

[56] References Cited

U.S. PATENT DOCUMENTS

| | | | |
|---|---|---|---|
| 2,068,119 | 1/1937 | Whitfield | 169/11 |
| 2,143,311 | 1/1939 | Geertz | 169/11 |
| 2,207,662 | 7/1940 | Edmundson | 169/11 |
| 2,278,192 | 3/1942 | Cantacuzene | 220/85 VS |
| 2,287,873 | 6/1942 | Geertz et al. | 169/31 |
| 2,525,570 | 10/1950 | Williamson | 82/1 |
| 3,823,567 | 7/1974 | Corini | 62/3 |
| 3,973,938 | 8/1976 | Szabo | 62/3 |
| 4,287,720 | 9/1981 | Barthel | 62/3 |
| 4,441,325 | 4/1984 | Bon-Mardion et al. | 62/3 |
| 4,441,332 | 4/1984 | Wilkinson | 62/238 |
| 4,441,335 | 4/1984 | Bonne | 62/324 |
| 4,441,901 | 4/1984 | Endoh | 62/160 |
| 4,506,510 | 3/1985 | Tircot | 62/3 |

Primary Examiner—Lloyd L. King
Attorney, Agent, or Firm—Buell, Ziesenheim, Beck & Alstadt

[57] ABSTRACT

An apparatus and method for controlling the temperature and pressure of confined substances is disclosed. Heat may be removed from or added to a substance within a tank or pipe by means of thermal conduction between the substance and a thermoelectric heat pump. As a result, undesired vaporization and soldification of the substance within the tank is prevented and the temperature and pressure thereof may be controlled. A temperature and/or pressure sensor is utilized to activate the heat pump at appropriate times and various ways are disclosed to provide maximum thermal heat transfer between the substance within the tank and the heat pump.

9 Claims, 9 Drawing Figures

METHOD AND APPARATUS FOR CONTROLLING THE TEMPERATURE AND PRESSURE OF CONFINED SUBSTANCES

BACKGROUND OF THE INVENTION

I. Field of the Invention

This invention relates to a method and apparatus for controlling the temperature and pressure of confined substances. more specifically, a thermoelectric heat pump is utilized to maintain the interior of a pipe or vessel within a desired temperature and pressure range. As a result, undesired vaporization and solidification of substances stored within or moving through the vessel or pipe are prevented. The present invention may be utilized, for example, for keeping carbon dioxide within a vessel in liquid form.

II. Description of the Prior Art

The use of low pressure liquid carbon dioxide in fire extinguishing equipment is well known in the art. Its use is also known in the food processing, beverage and water treatment industries. Most known systems provide an insulated storage tank equipped with mechanical refrigeration apparatus in order to maintain the carbon dioxide at a suitable sub-atmospheric temperature. See, for example, U.S. Pat. Nos. 2,143,311; 2,068,119; and 2,287,873.

U.S Pat. No. 2,068,119 discloses a method of generating carbon dioxide gas from a supply of solid carbon dioxide. U.S. Pat. No. 2,207,662 suggests the use of a dwelling's hot water supply to prevent carbon dioxide in a tank from freezing upon the release of a portion thereof.

A major problem with these methods is that they require the use of the motors, fans, compressors, coils and the like which are associated with conventional mechanical refrigeration equipment. These components add undesirable weight and complexity to the system. One known method of avoiding this problem is disclosed in U.S. Pat. No. 2,525,570 in which a portable secondary tank having no refrigeration equipment is used for short term storage in conjunction with a stationary primary tank. The primary tank, however, must still be provided with the refrigeration equipment.

Another problem with conventional devices is that they commonly will not operate when the ambient temperature is below 0° F. unless the tank is pressurized, by removing a portion of the carbon dioxide, heating the removed portion and returning it to the top of the tank.

Various forms of heat pumps are known in the art. See, U.S. Pat. Nos. 4,441,335; 4,441,901; 4,441,332; and 4,441,325. The use of small heat pumps for thermoelectric cooling is also known. The advantages of using heat pumps for the purpose of controlling the temperature and pressure of confined substances or for keeping carbon dioxide in liquid form, however, is not taught nor suggested in the art.

There remains, therefore, a need for an apparatus and method for storing carbon dioxide or other substances in liquid form or at a desired temperature and pressure which does not require the various components of a conventional refrigeration system. There further remains a need for a system which allows carbon dioxide or other substance within a tank to be heated by a source other than a hot water system provided for a dwelling.

It is an object of the present invention to provide an apparatus and method for controlling the temperature and pressure of confined substances which eliminates the need for the various motors, fans and compressors associated with conventional refrigeration systems.

It is another object of the invention to provide cooling means which causes vaporized carbon dioxide or other substance within a tank or pipe to condense to a liquid form.

It is yet another object to provide heating means to prevent liquid carbon dioxide or other substance within a tank or pipe from freezing when outside ambient temperatures drop, thus providing sufficeint vapor pressure for proper system operation.

It is yet another object to utilize a thermoelectric heat pump as both the cooling and heating means for the present invention.

SUMMARY OF THE INVENTION

The present invention provides a novel apparatus for controlling the temperature and pressure of confined substances. As used herein, the term tank is used to include any closed container in which a substance may be stored such as a pressure vessel and/or a pipe or other conduit through which a substance may be transported. Although the following descriptions refer primarily to an apparatus and method of keeping carbon dioxide in liquid form, the present invention is not limited thereto. It will be obvious to those skilled in the art that the apparatus and methods described herein may be likewise utilized to control the temperature and pressure of any confined substance, such as Freon or Halon, for example, or any other gaseous or liquid products or combinations thereof.

The apparatus for keeping carbon dioxide in liquid form includes a storage tank which has an interior and an exterior portion. The tank is adapted to receive carbon dioxide within its interior and includes one or more lines which enter the tank for filling the tank with carbon dioxide and for its subsequent removal. A thermoelectric heat pump is attached to the tank. The heat pump includes a cold plate, a heat sink, a semiconductor material positioned between the cold plate and heat sink, and a power supply electrically connected to the semiconductor material. The heat pump is attached in a manner whereby undesired heat within the interior of the tank which causes the carbon dioxide therein to vaporize is transferred to the cold plate by means of thermal conduction. Heat received by the cold plate may thereafter be transferred between the cold plate and the heat sink by means of charged carriers moving within the semiconductor material. Additionally, when the tank lacks sufficient heat to keep the liquid carbon dioxide from freezing or to provide sufficient vapor and pressure for proper operation, heat from the heat sink or otherwise generated by the heat pump may be transferred to the cold plate and thermally conducted to the interior of the tank.

A temperature and/or pressure sensing means is positioned within or accessible to the tank and is connected to the heat pump. The sensing means is utilized to activate the heat pump when needed and to control whether the heat pump adds or removes heat from the tank. Reversing the polarity of the heat pump causes it to transfer heat in opposite directions and in some cases to generate heat because of electrical resistance in the semi-conductive material.

Various embodiments of the present invention are provided to permit thermal conduction between the interior of the tank and the cold plate. One such method includes the placing of the cold plate directly on an exterior surface of the tank itself. With this method, the portion of the tank which contacts the cold plate is preferably fabricated from a thermal conductive material such as aluminum or steel. Alternatively, the outer surface of the tank may be clad with a thermal conductive material to form an auxiliary heat conducting means.

Another embodiment of the invention contemplates the provision of an opening in an upper portion of the tank into which the cold plate may be placed in direct contact with carbon dioxide vapor inside the tank. With this method, the cold plate is provided on the interior of the tank and the heat sink on the exterior of the tank, thereby providing an efficient heat transfer means allowing greater control of temperature and pressure than was previously possible.

Other embodiments of the present invention contemplate the provision of heat exchanger tubing which contacts both the vapor within the tank and the cold plate itself. A suitable fluid may be circulated within the heat exchanger tubing as is common with other types of refrigeration systems. Alternatively, a plurality of heat transfer pipes attached to the cold plate could extend through a wall of the tank into the vapor space within the interior of the tank. Finally, the use of a chemical gel or chemical salts is contemplated as yet another thermal conducting means between the cold plate and the storage tank.

DETAILED DESCRIPTION OF THE PREFERRED EMBODIMENTS

Figure 1:
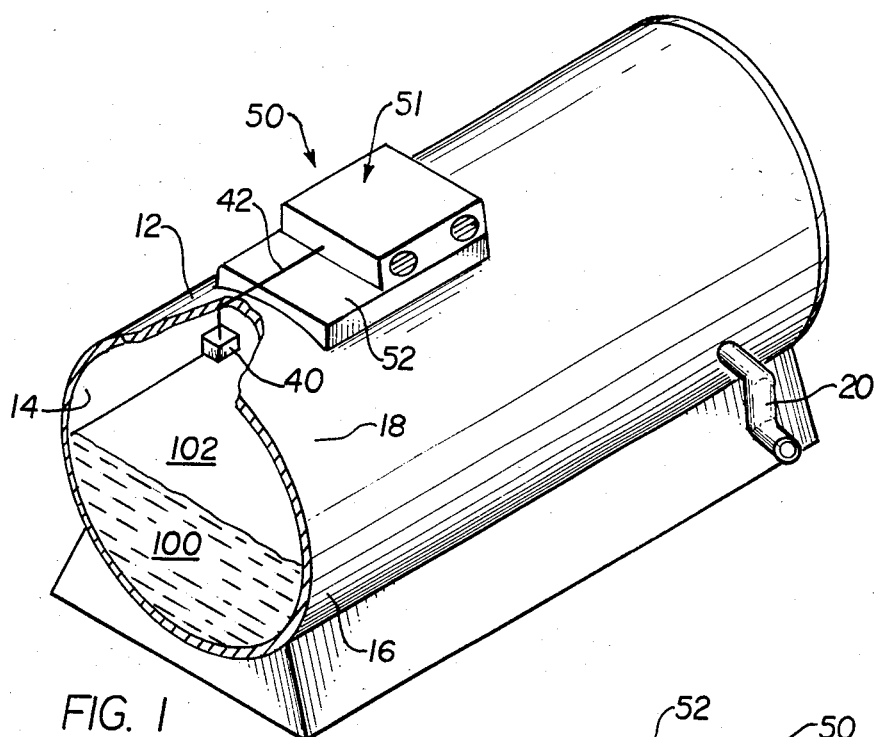
FIG. 1 is a perspective view partially broken away and in schematic form of a first embodiment of the present invention showing the preferred configuration of the tank and a first heat pump.

Referring specifically to FIG. 1, a storage tank 10, which may be provided in any desired size or configuration, is utilized to contain carbon dioxide. Tank 10 is preferably fabricated from steel and is constructed to pressure vessel code standards of the American Society of Mechanical Engineers. Preferably, the tank can withstand average pressures within the range of 290 to 310 p.s.i. Tank 10 has an exterior portion or surface 12 and an interior portion 14. By methods which are well known in the art, it is preferred to provide a suitable insulation material (not shown) around the exterior surface 12 of tank 10 within an outer shell (not shown). A suitable inlet/outlet means 20 which may, for example, take the form of a tube or pipe extending through a wall portion of the tank, is provided to permit the placement into and removal of carbon dioxide from the interior portion 14 of tank 10. In FIG. 1, liquid carbon dioxide 100 is shown in lower portion 16 of tank 10 and vaporized or gaseous carbon dioxide 102 is shown in upper portion 18 of tank 10.

A thermoelectric heat pump means 50, which includes, among other things, a cold plate 52 and a power supply 60, is attached to outer surface 12 of upper portion 18 of tank 1. Cold plate 52 is placed in direct contact with outer surface 12 so that undesired heat within the interior of the tank causing the carbon dioxide therein to vaporized is transferred by means of thermal conduction through the metallic wall of the tank to cold plate 52. Similarly, when the liquid 100 begins to solidify or when vapor pressure within the tank drops below the system's requirements, heat may be conducted from cold plate 52 through the wall of the tank to its interior. It will be obvious to those skilled in the art that if an insulated tank having an outer shell is used, a portion of the outer shell and insulation material will be removed to allow cold plate 52 to directly contact outer surface 12 of tank 10.

Temperature and/or pressure sensing means 40 is preferably provided within interior 14 of tank 10. Alternatively, a remote sensing means may be utilized in connection with suitable lines and access ports. Sensing means 40 is electrically connected to heat pump means 50 by line 42. When the temperature and/or pressure within tank 10 falls within a desired range, heat pump means 50 does not operate. When the temperature pressure in the tank rises, heat pump means 50 is activated by direct current power source 60 and heat from within the tank is transferred from cold plate 52 to heat sink 54 (FIG. 2) on the exterior of the tank thereby cooling the interior of the tank. When the temperature or pressure in the tank drops below the desired temperature range, heat pump 50 is activated with direct current electricity of an opposite polarity and heat is transferred from the heat sink 54 to the cold plate 52 within the tank thereby heating the interior of the tank. Electrical resistance in the heat pump's semiconductor material may also be utilized to heat the cold plate. Suitable fans may be used to assist in dissipation of heat from heat sink 54 when the heat load is large or when the ambient temperature is high.

Figure 2:
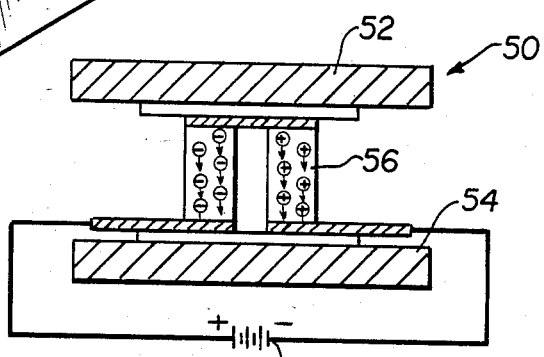
FIG. 2 is a cross-sectional view in schematic form of a typical thermoelectric heat pump.

FIG. 2 is a cross-sectional view in schematic form of the thermoelectric heat pump means 50 of FIG. 1. Heat pump 50 includes the cold plate means 52, heat sink 54 with a semiconductor material 56 positioned between said cold plate 52 and heat sink 54. The cold plate and the heat sink are each preferably attached to the semiconductor material by a material which has both electrical insulation and thermal conduction properties. A power source 60 as seen in FIG. 2 is attached to the semiconductor in a manner whereby an induced electrical current provided within the semiconductor material causes heat to be transferred in either direction between the cold plate and the heat sink by means of charged carriers moving within the semiconductor material. Heat pumps of this type are well known in the art. Hereinafter the portion of heat pump 50 excluding cold plate 52 will be referred to as the thermoelectric unit 51.

Figure 3:
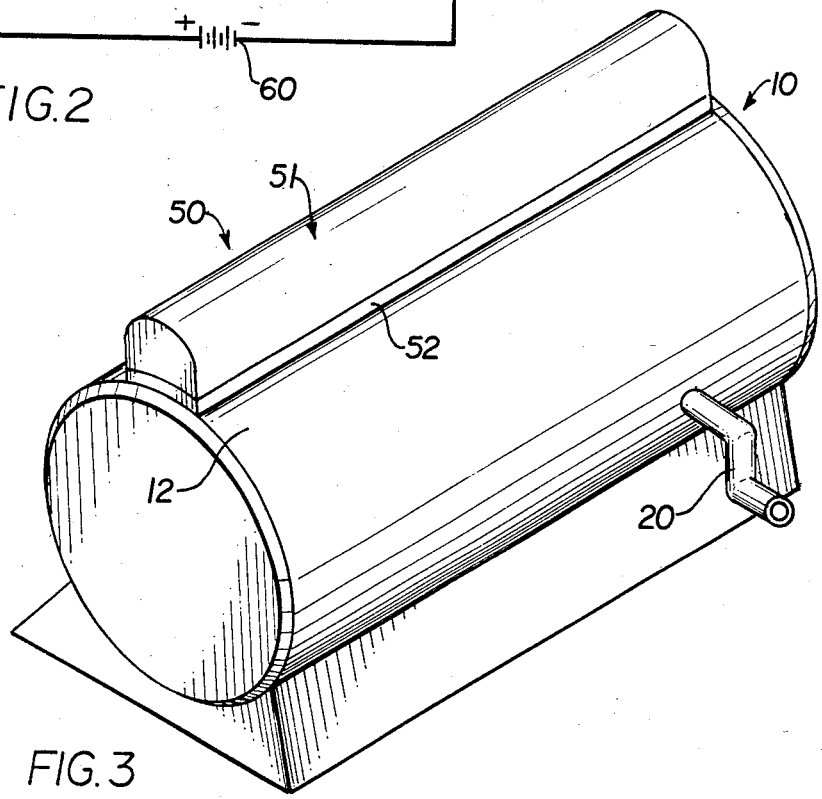
FIG. 3 is a perspective view of the tank of FIG. 1 showing an alternative heat pump having a cold plate which extends the entire length of the tank.

FIG. 3 illustrates that heat pump means 50 may have any desired configuration, and as shown, may include a cold plate 52 which extends the entire length of the tank 50. It will be obvious to those skilled in the art that by providing a greater area of contact between surface 12 of tank 10 and cold plate 52 so that a greater quantity of heat may be thermally conducted to and from the carbon dioxide in the tank.

Figure 4:
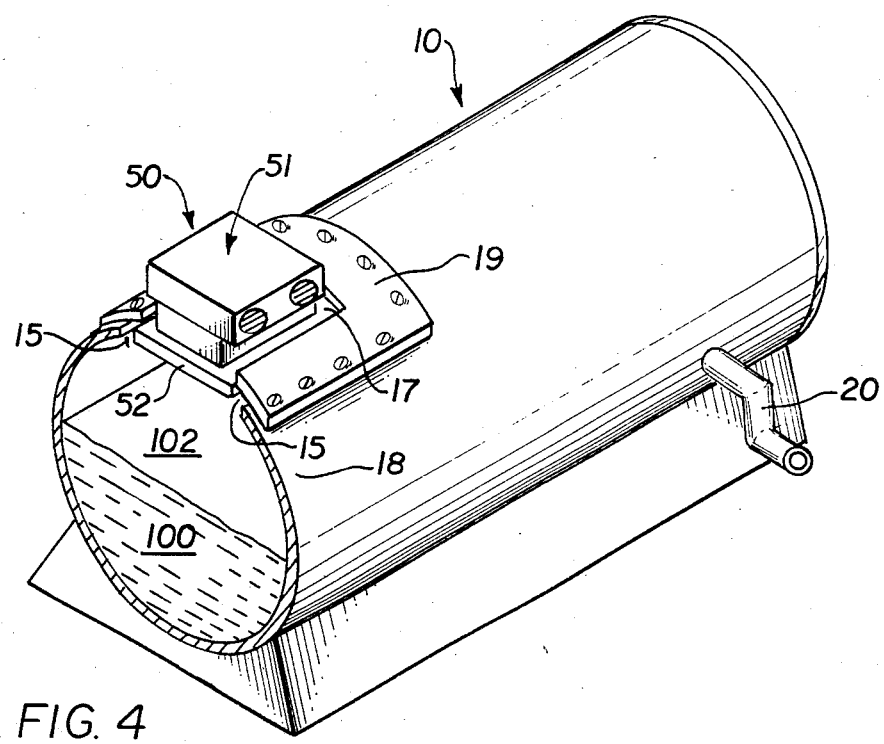
FIGS. 4 and 4a are perspective views partially broken away and in schematic form of a second embodiment of the present invention showing two tank configurations having the cold plate of a heat pump positioned within the tank.

FIG. 4 illustrates a tank 10 having an opening 15 provided in an upper portion 18 thereof. Cold plate 52 and a thermoelectric unit 51 are mounted on opposite sides of an opening 17 of mounting plate 19. Mounting plate 19 is then mounted over opening 15 at tank 10 with thermoelectric unit 51 facing outward and cold plate 52 facing inward. Plate 19 is preferably bolted to the tank and suitable gaskets are provided to withstand the system's operature pressures. With this arrangement, the cold plate 52 is supported by the access plate in direct contact with carbon dioxide vapor 102 inside the storage unit 10, thereby providing a more direct means of thermal conduction between the carbon dioxide and cold plate.

Figure 4A:
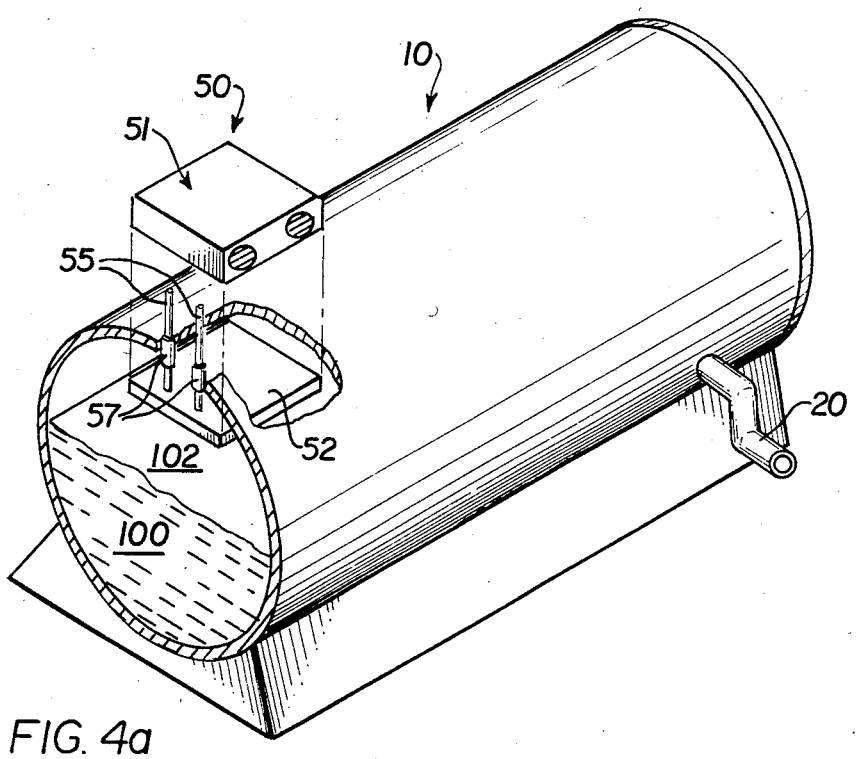

FIG. 4a shows another tank configuration wherein cold plate 52 is placed inside of tank 10 and is connected to thermoelectric unit 51 mounted on the exterior 12 of tank 10 by electrical conductors 55 which pass through sealed access ports 57 in the tank wall.

It is noted that none of the embodiments of FIGS. 1 through 4a include any auxiliary heat conducting means.

Figure 5:
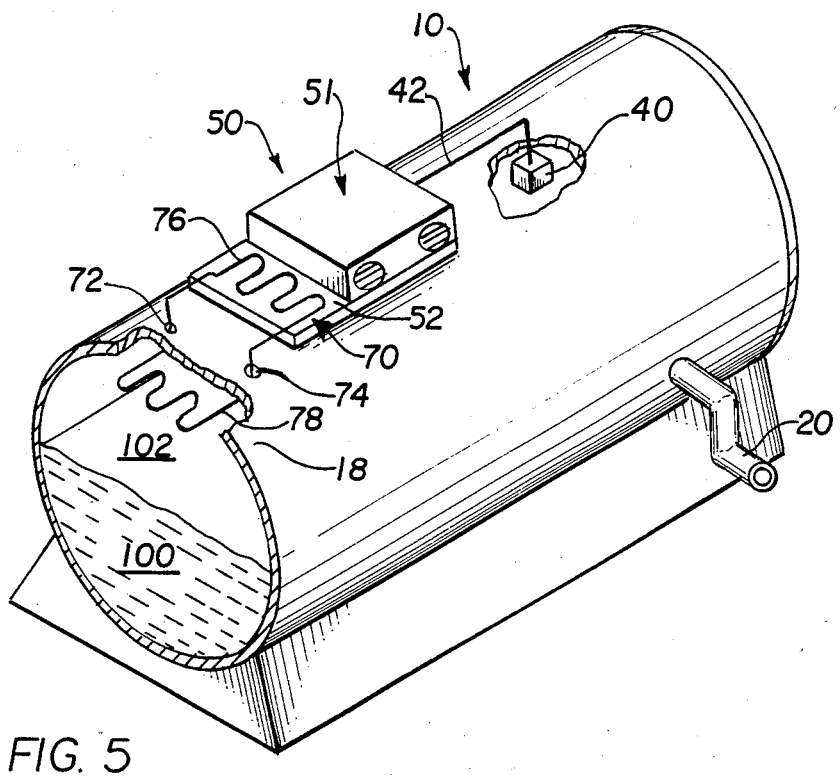
FIG. 5 is a perspective view of the tank of FIG. 1 showing the provision of a heat exchanger tubing loop for thermally conducting heat between the interior of the tank and cold plate of the heat pump.

FIG. 5 shows an apparatus including heat pump means 50 attached to tank 10 as in FIG. 1 and coil tubing means 70. Tubing means 70 is in the form of a continuous loop which passes through upper portion 18 of tank 10 at two sealed access ports 72 and 74. Tube means 70, therefore, has a portion 76 which is external to tank 10 and which is positioned in direct contact with cold plate 52. Tube means 70 also has a portion 78 which extends into the interior space of tank 10 and which contacts the vaporized carbon dioxide 102. By circulating a suitable fluid through tubing means 70, greater thermal conduction of heat from the vaporized carbon dioxide 102 to cold plate 52 may be obtained. In this embodiment of the invention, tubing means 70 serves as an auxiliary heat conducting means.

Figure 6:
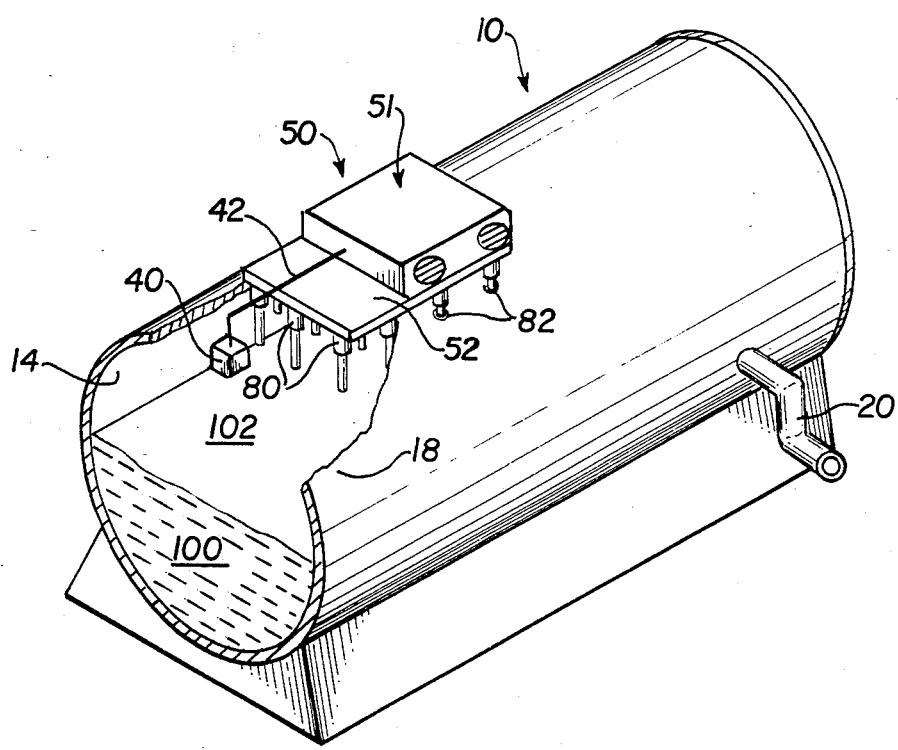
FIG. 6 is a perspective view of the tank of FIG. 1 showing a plurality of individual heat pipes extending downwardly from the cold plate into the interior of the tank.

FIG. 6 shows an alternative method of providing additional thermal conduction between cold plate 52 and vaporized carbon dioxide 102. In this embodiment, a plurality of thermally conducting heat pipes 80 containing a suitable low pressure liquid are attached to and extend downwardly from the cold plate 52 through openings 82 in upper portion 18 of tank 10 into the interior portion 14 of the tank. In this embodiment of the invention, heat pipes 80 serve as an auxiliary heat conducting means.

Figure 7:
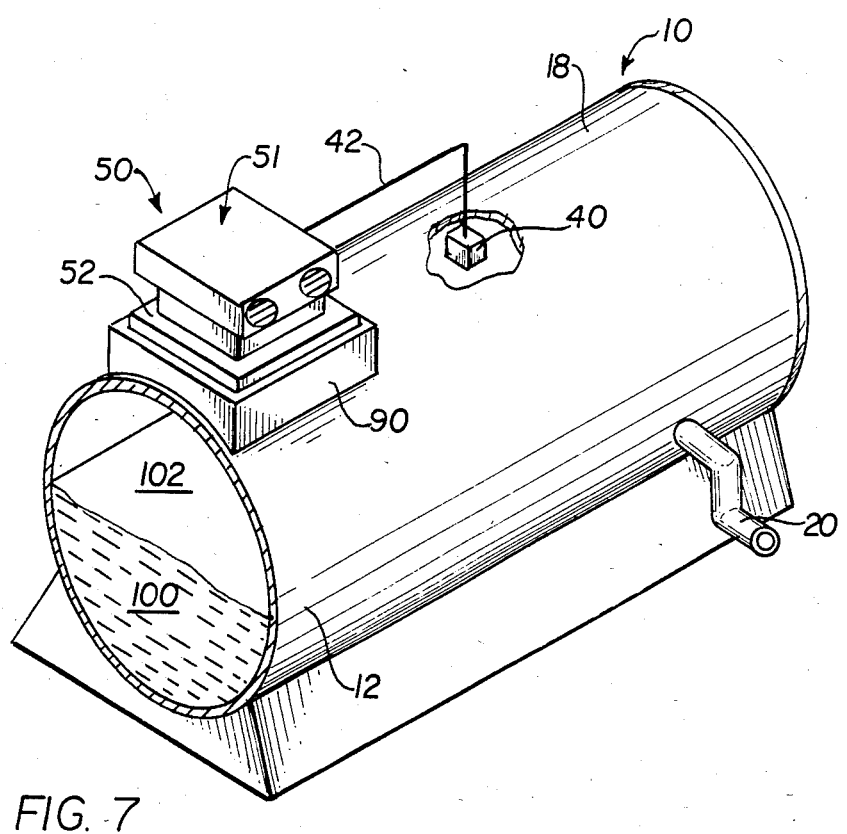
FIG. 7 is a perspective view of the tank of FIG. 1 showing the provision of a sealed heat transfer container of chemical salts positioned between the cold plate and the tank.

FIG. 7 illustrates that yet another method of providing thermal conduction between cold plate 52 and vaporized carbon dioxide 102 may be obtained by utilizing suitable chemical salts or gels in a container 90 attached to outer surface 12 of upper portion 18 of tank 10. The sealed container is directly coupled or placed in direct contact with the cold plate 52 and heat transfer is accomplished or enhanced by the change of state of the salts or gel within the container. In this embodiment of the invention, container 90 serves as an auxiliary heat conducting means.

Figure 8:
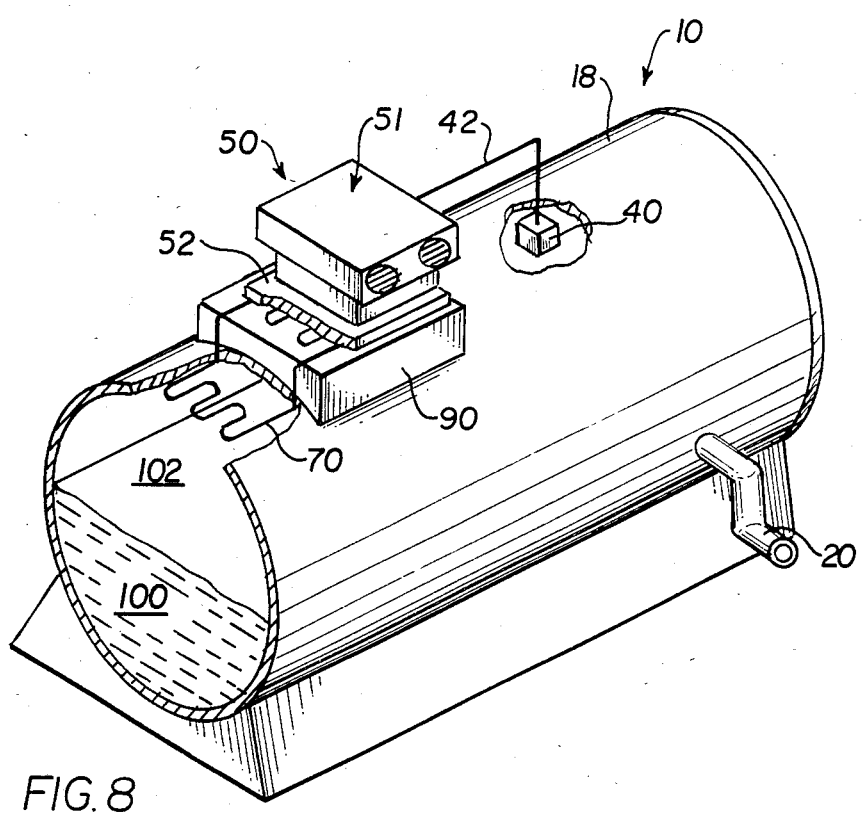
FIG. 8 is a perspective view of the tank of FIG. 1 showing the provision of a plurality of heat exchanger means between the cold plate and the interior of the tank.

Finally, FIG. 8 illustrates that more than one thermal conducting means may be utilized at any given time to achieve maximum efficiency. In FIG. 8 the container 90 of FIG. 7 which contains a suitable chemical salt or gel is utilized in combination with the heat exchanger tubing means 70 of FIG. 5. In this embodiment of the invention, container 90 and tubing means 70 each serve as auxiliary heat conducting means.

It will be obvious to those skilled in the art that the apparatus and method described herein may also be utilized to increase the speed at which carbon dioxide (or other substances) may be delivered to remote locations. By cooling the pipe carrying the carbon dioxide, vaporization is minimized allowing more liquid to be delivered and utilized at the remote locations. This feature is especially advantageous in fire protection systems where carbon dioxide must be delivered as quickly as possible.

In the foregoing specification, I have set out certain preferred practices and embodiments of this invention, however, it will be understood that this invention will be otherwise variously embodied within the scope of the following claims.

I claim:

1. An apparatus for controlling the temperature and pressure of confined substances comprising:
   a. tank means having interior and exterior portions and adapted to receive a pressurized substance within the interior portion thereof;
   b. thermoelectric heat pump means including cold plate means, heat sink means, a semiconductor material positioned between said cold plate and heat sink means and a power supply electrically connected to said semiconductor material, said heat pump means attached to said tank in a manner whereby undesired heat may be removed from and desired heat may be added to the interior of the tank by means of thermal conduction between the heat pump means and the tank interior;
   c. temperature sensing means and pressure sensing means each operatively associated with the interior of the tank and electrically connected to the heat pump means to activate the heat pump to remove heat from the tank when at least one of the temperature and pressure rises above a predetermined maximum level and to add heat to the tank when at least one of the temperature and pressure falls below a predetermined minimum level; and
   d. auxiliary heat conducting means attached directly to at least one surface of the cold plate of the heat pump means and placed in thermal communication with the interior of the tank to increase the efficiency of thermal transfer between the cold plate and the tank interior.

2. An apparatus according to claim 1 wherein said tank is fabricated from a thermally conducting material.

3. An apparatus according to claim 1 wherein a layer of insulation is provided around the exterior of the tank.

4. An apparatus according to claim 1 wherein said cold plate means is placed into direct contact with the exterior surface of said tank.

5. An apparatus according to claim 1 wherein said cold plate means is positioned in the interior of the tank.

6. An apparatus according to claim 1 wherein the auxiliary heat conducting means comprises tubing means attached to said cold plate and extending into the interior of the tank.

7. An apparatus according to claim 1 wherein the auxiliary heat conducting means comprises a plurality of thermally conducting heat pipes attached to said cold plate and extending downwardly therefrom through a plurality of openings provided in an upper portion of said tank.

8. An apparatus according to claim 1 wherein the auxiliary heat conducting means comprises a sealed heat transfer container means, said container means containing one of chemical salts and chemical gels, said container attached to said exterior surface of said tank and directly coupled to said cold plate means.

9. An apparatus for keeping carbon dioxide liquid comprising:
  a. tank means having interior and exterior portions and adapted to receive pressurized carbon dioxide within the interior portion thereof; and
  b. thermoelectric heat pump means including cold plate means, heat sink means, a semiconductor material positioned between said cold plate and heat sink means and a power supply electrically connected to said semiconductor material, said heat pump means attached to said tank in a manner whereby undesired heat may be removed from said desired heat may be added to the interior of the tank by means of thermal conduction between the heat pump means and the tank interior thereby preventing unwanted vaporization and solidification of the carbon dioxide within the tank;
  c. temperature sensing means and pressure sensing means each operatively associated with the interior of the tank and electrically connected to the heat pump means to activate the heat pump to remove heat from the tank when at least one of the temperature and pressure rises above a predetermined maximum level and to add heat to the tank when at least one of the temperature and pressure falls below a predetermined minimum level; and
  d. auxiliary heat conducting means attached directly to at least one surface of the cold plate of the heat pump means and placed in thermal communication with the interior of the tank to increase the efficiency of thermal transfer between the cold plate and the tank interior.

* * * * *

UNITED STATES PATENT AND TRADEMARK OFFICE
CERTIFICATE OF CORRECTION

PATENT NO. : 4,593,529
DATED : June 10, 1986
INVENTOR(S) : VALENTINE L. BIROCHIK It is certified that error appears in the above-identified patent and that said Letters Patent is hereby corrected as shown below:

Column 1, line 10, change "more" to --More--.

Column 8, claim 9, sub-paragraph b, line 7, "said" should read --and--.

Signed and Sealed this

Seventh Day of October, 1986

[SEAL]

Attest:

DONALD J. QUIGG

Attesting Officer

Commissioner of Patents and Trademarks